Patented Mar. 11, 1952

UNITED STATES PATENT OFFICE 2,588,828

COMPOSITION FOR AND METHOD OF PRODUCING COATED CEMENT SURFACES AND THE PRODUCT RESULTING THEREFROM

Norman S. Greiner, Somerville, N. J., assignor to Johns-Manville Corporation, New York, N. Y., a corporation of New York No Drawing. Application December 11, 1948, Serial No. 64,900

7 Claims. (Cl. 117—123)

This invention relates to durable weather resistant coatings, and more particularly to an improved coating composition and method of forming the coating.

An object of the invention is that of providing a smooth, durable, fireproof and weather resistant coating for asbestos-cement shingles and other structural articles.

The invention is particularly concerned with the problem of providing structural articles of hydraulic cement composition including asbestos-cement shingles, siding sheets and the like, with durable, fireproof and decorative coatings. Colored shingles of this general type have been produced by incorporating pigment in the body of the shingle, but this method involves an uneconomical use of pigment, and the product is unsatisfactory because the rough surface collects dust and dirt and the coloring is non-permanent because of weather streaking and soiling. Use of fused ceramic coatings is not permissible because the heat required to set up such coatings permanently injures the shingle or base sheet by causing loss of strength, spalling and warping. Colored coatings have been proposed incorporating as their principal constituents a soluble alkali silicate and a clay substance, or a reactive oxide such as zinc oxide. Such compositions can be set up to a relatively weather resistant coating by hardening at temperatures of the order of 700–1000° F., but even these temperatures are so high as to adversely affect the strength of the base sheet.

Another object is to provide a method whereby structural articles of hydraulic cement composition such as asbestos-cement shingles may be simply and economically coated with smooth, durable, weather resistant decorative finishes without injury to the article.

A further object is to provide a liquid coating composition which is hardenable at low temperatures and which retains suitable viscosity stability at normal temperatures as to permit of its use in a commercially practicable coating cycle.

A particular object is to provide a heat hardenable decorative inorganic coating composition which can be applied by conventional brush or spray methods and can be set up at temperatures not substantially exceeding 500° F. to provide a tough and durable weather resistant coating of fine grained and smooth texture having high resistance to deterioration in use.

With the above objects in view the invention consists in the improved coating composition and method of forming coatings which are hereinafter described and more particularly defined by the accompanying claims.

The principal reactive components of the liquid coating composition which forms the subject of the present invention are a soluble alkali silicate solution of high silica to alkali ratio, and an emulsified organosiloxane polymer containing alkyl, aryl, and preferably both alkyl and aryl groups. During the heat curing of the coating at temperatures approximating but not substantially exceeding 500° F., the siloxane polymer may enter into combining reaction with some of the excess silica in the silicate solution. In any event the siloxane undergoes further linear and cross link polymerization during heat cure, with simultaneous removal of water from the coating, and precipitation of insoluble silicic acid gel, with resulting formation of a hard durable waterproof coating.

Suitable organosiloxane polymers for use in the coating composition include linear and cross-linked di-methyl silicones, di-ethyl silicones, methyl-ethyl silicones, phenyl silicones, methyl-phenyl silicones, or other blends of the above. The organosiloxane polymer may contain both linear silicones and cross-linked silicone resins such as the following:

(1) 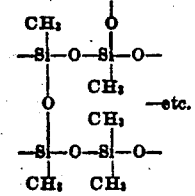

(2) 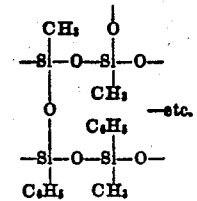

It will be noticed that in Formula 1 the cross-linked methyl silicone polymer has an average of less than two methyl groups per silicon atom. A cross-linked polymer such as shown in Formula 2 incorporates both methyl or other alkyl and phenyl groups in its molecular structure, and this is a preferred form of organosiloxane, as its use appears to impart increased physical strength and toughness to coatings incorporating this type of siloxane polymer. Various blends of emulsified linear alkyl or alkyl-aryl silicones with cross-linked alkyl or alkyl-aryl silicones of the types referred to above have been found useful in the present coating compositions.

These heat hardenable coating compositions are adapted for application in liquid paint form, and possess such viscosity stability as to permit of storage for reasonable periods without deterioration, and for application by conventional brushing, dipping or spraying methods. The physical and chemical properties of the coating composition are such as to permit of its application and hardening by a continuously operating coating and drying cycle of short duration. The principal reactive components of the present coating composition are of such nature that a durable set can be developed at comparatively low drier operating temperatures and within reasonable time limits at such temperatures.

The present coating composition is an aqueous suspension of soluble and finely divided insoluble constituents, primarily inorganic. The viscosity of the suspension at the temperature at which it is applied as a coating should be such as to provide a coating having a thickness of two to five mils. Coatings of this thickness are ample to impart smooth decorative and weather resistant finishes which are durable and which at the same time have sufficient flexibility to withstand wide and rapid temperature changes without separating from the base material.

The coating composition preferably embodies alkali silicate solution of 32–40% concentration or about 40° Baumé gravity, as a source of silica in solution form and also as a liquid vehicle suitable for carrying finely divided insoluble nonreactive pigment and filler constituents in uniformly distributed dispersed form, during the coating and baking operations. A preferred alkali silicate solution is one of high silica content, exemplified by potassium silicate having a molar ratio of $K_2O$ to $SiO_2$ of 1 to 3.91 and comprising approximately 8.85% $K_2O$ by weight and 22.1% $SiO_2$. The potassium oxide-silica ratio of the potassium silicate solution may be reduced somewhat to a molar ratio of say 1 to 3.25, in which the silica represents 26.2% by weight and the $K_2O$ 12.45%. A suitable sodium silicate solution for use in the coating composition contains by weight 28.7% silica and 8.9% $Na_2O$.

In addition to the reactive soluble silicate and emulsified alkyl, or aryl, or alkyl-aryl siloxane, the coating composition also contains unreactive mineral pigments of the type of titanium oxide, iron oxide and chrome oxide. The amount of pigment present in the coating may be substantially limited by incorporating in the coating composition not only the reactive constituents and pigments previously referred to, but also inert substantially colorless filler materials of the type of blanc fixe and fine airfloated silica.

The following formula presents a suitable liquid coating suspension adapted for application by conventional methods, followed by baking to a thin set film:

| | Parts by weight, per cent |
|---|---|
| Potassium silicate solution (8.85% $K_2O$, 22.1% $SiO_2$) | 59.4 |
| Water | 20.8 |
| $TiO_2$ | 12.8 |
| $CrO_3$ | 2.8 |
| Silicone emulsion | 4.2 |

Expressed in terms of solids and water present, the above formula may be stated as follows:

| | Per cent |
|---|---|
| $K_2O$ | 5.25 |
| $SiO_2$ | 13.2 |
| Silicone solids | 1.2 |
| Water | 64.75 |
| Pigments | 15.6 |

The molar ratio of $K_2O$ to $SiO_2$ in the potassium silicate solution used in the above formula was 1 to 3.91. This silicate solution can be replaced by a potassium silicate solution having a molar ratio of $K_2O$ to $SiO_2$ of 1 to 3.25. A typical analysis of such solution shows 26.2% $SiO_2$, 12.45% $K_2O$, with the solution having an average Baumé gravity of 40.5. There is some advantage in employing a potassium silicate solution having a higher molar ratio of $SiO_2$ to $K_2O$ than 3.25 to 1, in that the solution of higher ratio produces finishing coats of greater weather resistance after curing in the presence of emulsified silicone resin.

The above formula may also be varied by substituting sodium silicate solution, as for example one containing 28.7% $SiO_2$ and 8.9% $Na_2O$. The formula may also be varied by changing the percentage of potassium or sodium silicate, and of silicone emulsion. It has been found that suitable coatings are obtained when the proportion of dry silicone resin to dry alkali silicate ranges between 4% and 10%. In the above formula it will be noted that the dry weight of silicone resin represents 6.5% of the dry weight of potassium silicate. Increasing the percentage of silicone resin (dry weight) substantially above 10% of the dry weight of alkali silicate has a tendency to develop blistering of the coating during its bake curing cycle. The alkali silicate should comprise 50–60% of the coating composition on the dry basis, with the siloxane present in the amount of 3–6% dry weight.

A typical slow drying and baking cycle suitable for a silicate-silicone coating such as presented in the above formulae calls for a fifteen minute heating period at 250° F., a ten minute heating period up to 300° F., a ten minute heating period up to 350° F. and forty-five minutes at a final baking temperature of 475 to 500° F. Silicate-silicone coatings such as outlined in the above formulae, after baking according to this baking schedule, exhibited excellent weathering qualities under exposure to accelerated outdoor weathering tests.

The formulae heretofore presented may be adapted for high speed radiant heat baking, without serious tendency to blister, by incorporating in the formula as an inert filler about 9–10.5% of finely divided calcined diatomaceous earth.

A principal reactive component of the present coating is the silicone resin. Because of the presence of this resin in the coating composition the coating sets up at a temperature not substantially exceeding 500° F. to a highly durable and weather resistant flexible coating within a reasonable curing time. The bond which develops on heat curing thin films of the present coating composition is so strong as to permit of inclusion in the coating of comparatively large portions of inert mineral pigments and fillers. The heat cured coatings withstand accelerated hot water tests and freeze thaw weathering tests much better than conventional coatings of this general type.

The coating composition may be considerably varied while using a total water content approximating 60–65% by weight. The dry weight proportion of soluble alkali silicate present preferably exceeds the dry weight proportion of silicone resin in the ratio of about 10–15 to 1. When a silicone resin is present in the composition in proportions representing about 6 to 7% of the dry weight of the alkali oxide, and when the alkali silicate approximates 18 to 20% of the coating composition, the heat bonding properties of the composition are such that its content of pigment and inert filler materials may total as much as 40–50% of the dry weight of the composition.

The liquid coating composition is particularly designed for application as a thin decorative veneer to a surface of a structural sheet or shape comprising indurated Portland cement or other hydraulic cement, and reinforcing fibers. Since at the time of its application to the surface of the base sheet a principal element of the coating composition is soluble sodium or potassium silicate, the weather resistant properties of the final cured coating must depend on a reaction with the soluble sodium or potassium silicate developing an insoluble coating. During the heat curing and drying of the coating in place on the surface of the base sheet, water is removed accompanied by gel formation, precipitation of silica, and development of irreversible silicic acid gel. There is also some leaching out of incompletely reacted lime from the surface of the base sheet during the drying operation on the coating. The lime which is thus released undergoes base exchange reactions with soluble alkali components of the coating during the drying and baking cure cycle, with the result that the final cured coating comprises stable silicic acid, and hydrous calcium silicate reinforced and waterproofed with polymerized alkyl-, phenyl-, or alkyl-phenyl-silicones. The cured coating which thus results is characterized by toughness, good weather resistance and strong adherence to the base sheet.

The invention which has been thus described by detailed example is not limited as to such details and it is to be understood that variations, changes and modifications are contemplated within the scope of the invention as defined by the following claims.

What I claim is:

1. A heat curable coating composition which is applicable by conventional spraying or brushing methods comprising a suspension of finely divided mineral fillers and emulsified organosiloxane polymer belonging to the group consisting of heat polymerizable alkyl and aryl siloxanes in a vehicle comprising an aqueous solution of alkali silicate having a molar ratio of alkali oxide/$SiO_2$ within the approximate range 1:3.20-3.90, said alkali silicate on the dry basis forming 50-60% by weight of the composition, and the siloxane being present in amount 3-6% dry basis to impart toughness, durability and weather resistance.

2. A heat curable coating composition which is applicable by conventional spraying or brushing methods comprising a suspension of finely divided mineral pigment and emulsified alkyl-phenyl silicone resin in a vehicle comprising an aqueous solution of alkali silicate having a molar ratio of alkali oxide/$SiO_2$ within the approximate range 1:3.20-3.90, said alkali silicate on the dry basis forming 50-60% by weight of the composition, and the silicone being present in the approximate dry weight proportion of 3-6% sufficient to impart toughness, durability and weather resistance.

3. A surface of hydraulic cement composition having thereon a smooth, durable, weather resistant coating comprising finely divided mineral fillers uniformly distributed throughout a matrix comprising a non-vitreous hydrated silica and an organosiloxane polymer belonging to the group consisting of heat polymerized alkyl and aryl siloxanes in amount approximating 3-6% by weight of the coating, said hydrated silica comprising on the dry basis a major binder component of the coating.

4. A structural unit of hydraulic cement composition having thereon a smooth, durable, weather resistant coating comprising finely divided mineral pigment uniformly distributed throughout a matrix consisting of a non-vitreous hydrated silica, lime silicate and an alkyl-phenyl silicone resin, said silicone comprising 3-6% of the dry weight of the coating.

5. The method of producing a durable, tough and weather-proof coating which comprises, suspending finely divided mineral fillers and emulsified organosiloxane polymer belonging to the group consisting of heat polymerizable alkyl and aryl siloxanes in an aqueous solution of alkali silicate, said solution having a mol ratio of $SiO_2$/alkali oxide within the range 3.2-3.9:1, said suspension containing on the dry basis 50-60% of alkali silicate and 3-6% polysiloxane, applying said suspension as a thin coating to a surface of hydrated hardened hydraulic cement, and setting up said coating by slow drying followed by baking at a temperature approximating 500° F.

6. The method of producing a durable, tough and weather-proof coating which comprises, suspending finely divided mineral pigment and emulsified alkyl-phenyl silicone resin in an aqueous solution of alkali silicate, said solution having a mol ratio of $SiO_2$/alkali oxide within the range 3.2-3.9:1, and said suspension containing on the dry basis 50-60% alkali silicate and 3-6% silicone, applying said suspension as a thin coating to a surface of hydrated hardened hydraulic cement, and setting up said coating by slow drying followed by baking to a final temperature approximating 500° F.

7. The method of producing a durable, weatherproof, and decorative coating for an asbestos-cement base sheet which comprises, applying to one surface of said sheet a thin aqueous coating composition to form a thin veneer, said composition comprising finely divided mineral pigment and emulsified polysiloxane belonging to the group consisting of alkyl and aryl siloxane polymer resins in an aqueous solution of alkali silicate having a solids concentration of 32-40% and having a mol ratio of $SiO_2$/alkali oxide within the range 3.2-3.9:1, said suspension containing on the dry basis 50-60% alkali silicate and 3-6% polysiloxane, and subjecting the thus coated sheet to a drying and baking cycle within the temperature range 250-500° F. under controlled temperature and time conditions.

NORMAN S. GREINER.

REFERENCES CITED

The following references are of record in the file of this patent:

UNITED STATES PATENTS

| Number | Name | Date |
| --- | --- | --- |
| 1,721,367 | Barringer | July 16, 1929 |
| 2,258,222 | Rochow | Oct. 7, 1941 |
| 2,302,583 | Shutt | Nov. 17, 1942 |
| 2,350,030 | Greider et al. | May 30, 1944 |
| 2,443,067 | Burns | June 8, 1948 |
| 2,455,999 | Hyde | Dec. 14, 1948 |

OTHER REFERENCES

Official Digest, November 1945, pages 413-414.